(12) United States Patent
Liu et al.

(10) Patent No.: US 10,777,206 B2
(45) Date of Patent: Sep. 15, 2020

(54) VOICEPRINT UPDATE METHOD, CLIENT, AND ELECTRONIC DEVICE

(71) Applicant: ALIBABA GROUP HOLDING LIMITED, Grand Cayman (KY)

(72) Inventors: Gang Liu, Seattle, WA (US); Qingen Zhao, Hangzhou (CN); Guangxing Liu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 34 days.

(21) Appl. No.: 16/009,564

(22) Filed: Jun. 15, 2018

(65) Prior Publication Data

US 2018/0366128 A1    Dec. 20, 2018

(30) Foreign Application Priority Data

Jun. 16, 2017 (CN) .......................... 2017 1 0459222

(51) Int. Cl.
| | | |
|---|---|---|
| *G10L 17/00* | (2013.01) | |
| *G10L 17/22* | (2013.01) | |
| *G10L 17/02* | (2013.01) | |
| *G10L 17/04* | (2013.01) | |
| *G10L 17/06* | (2013.01) | |

(52) U.S. Cl.
CPC .............. *G10L 17/22* (2013.01); *G10L 17/02* (2013.01); *G10L 17/04* (2013.01); *G10L 17/06* (2013.01)

(58) Field of Classification Search
USPC .................................. 704/231–257, 270–275
See application file for complete search history.

(56) References Cited

U.S. PATENT DOCUMENTS

| | | |
|---|---|---|
| 6,535,849 B1 | 3/2003 | Pakhomov et al. |
| 6,882,970 B1 | 4/2005 | Garner et al. |
| 7,272,594 B1 | 9/2007 | Lynch et al. |
| 7,295,979 B2 | 11/2007 | Neti et al. |
| 7,478,038 B2 | 1/2009 | Chelba et al. |
| 8,781,812 B2 | 7/2014 | Kadirkamanathan et al. |
| 9,324,322 B1 | 4/2016 | Torok et al. |
| 2002/0087315 A1 | 7/2002 | Lee et al. |
| 2002/0111794 A1 | 8/2002 | Yamamoto et al. |
| 2002/0184003 A1 | 12/2002 | Hakkinen et al. |
| 2005/0033575 A1 | 2/2005 | Schneider |

(Continued)

FOREIGN PATENT DOCUMENTS

| | | |
|---|---|---|
| WO | 2008124368 A1 | 10/2008 |
| WO | 2017/113973 A1 | 7/2017 |

OTHER PUBLICATIONS

International Search Report and Written Opinion for Application No. PCT/US2018/037741, dated Sep. 7, 2018, 13 pages.

*Primary Examiner* — Jesse S Pullias
(74) *Attorney, Agent, or Firm* — Sheppard Mullin Richter & Hampton LLP

(57) ABSTRACT

Data update methods, systems, and devices are disclosed. The method includes: acquiring at least a first piece of audio data of a user in a first conversation scenario and at least a second piece of audio data of the user in a second conversation scenario, performing voiceprint recognition on the first and second pieces of audio data based on voiceprint information of the user, acquiring audio feature information of the first and second pieces of audio data, and updating voiceprint information of the user according to the audio feature information.

16 Claims, 5 Drawing Sheets

(56) References Cited

U.S. PATENT DOCUMENTS

| | | |
|---|---|---|
| 2005/0234722 A1 | 10/2005 | Robinson et al. |
| 2006/0229864 A1 | 10/2006 | Suontausta et al. |
| 2007/0299666 A1 | 12/2007 | Li et al. |
| 2008/0147380 A1 | 6/2008 | Barliga et al. |
| 2008/0228482 A1 | 9/2008 | Abe |
| 2008/0240458 A1 | 10/2008 | Goldstein et al. |
| 2008/0256033 A1 | 10/2008 | Cheng |
| 2008/0312926 A1 | 12/2008 | Vair et al. |
| 2009/0248395 A1 | 10/2009 | Alewine et al. |
| 2011/0004473 A1 | 1/2011 | Laperdon et al. |
| 2013/0232073 A1* | 9/2013 | Sheets .............. G06Q 20/40145 705/44 |
| 2015/0112680 A1 | 4/2015 | Lu |

* cited by examiner

VOICEPRINT UPDATE METHOD, CLIENT, AND ELECTRONIC DEVICE

CROSS REFERENCE TO RELATED APPLICATION

The present application is based on and claims priority to Chinese Patent Application No. 201710459222.3, filed on Jun. 16, 2017, which is incorporated herein by reference in its entirety.

TECHNICAL FIELD

This application relates to the field of computer technologies, and in particular, to a data update method, a client, and an electronic device.

BACKGROUND

In the current information society, various social sectors such as security, finance, and justice all require personal identity verification. With the development of science and technologies, biometric feature identification technologies are gradually replacing traditional verification manners such as text passwords. Biometric feature identification technologies can closely combine computers with science and technological methods such as optics, acoustics, biometric sensors, and biometric statistical principles, and recognize personal identities by using extrinsic physiological features (for example, fingerprint, faces, iris, and voice) of human bodies. Biometric feature identification technologies are securer and more convenient and have better privacy protection than traditional identity recognition methods, and have several advantages, for example, biometric feature identification cannot be forgotten, has a desirable forgery prevention performance, cannot be stolen, is carried with people, and can be used at any time and any place.

Voiceprint recognition technologies have advantages such as having a low error receiving rate, having a low error rejection rate, easy extraction, being remotely recognizable, low costs of recognition devices, and high processing speeds compared with other biometric feature identification technologies. Therefore, voiceprint recognition technologies have been applied to multiple technical fields, in particular, the entertainment field, and bring great convenience to users. Because voiceprints are dynamically changeable, a change of personal circumstance (for example, emotion, illness, and age) or the external environment (for example, noise) and the like usually causes a user voiceprint change. In this way, in a voiceprint recognition process, user voiceprint verification usually fails because the user registered voiceprint and a verification voiceprint are inconsistent, causing poor user experience.

Therefore, the technologies urgently require a voiceprint data update method that can improve voiceprint recognition accuracy based on the user voiceprint feature change.

SUMMARY

A data update method, a client, and an electronic device are disclosed, so that voiceprint information can also change along with a user voice feature change or an external environment change, to improve adaptability of the voiceprint information and a success rate of registration user voiceprint recognition.

According to one aspect, a data update method comprises: acquiring at least a first piece of audio data of a user in a first conversation scenario and at least a second piece of audio data of the user in a second conversation scenario; performing voiceprint recognition on the first and second pieces of audio data based on voiceprint information of the user; acquiring audio feature information of the first and second pieces of audio data; and updating the voiceprint information of the user according to the audio feature information.

According to another aspect, a data update method comprises: acquiring at least a first piece of audio data of a user in a first conversation scenario and at least a second piece of audio data of the user in a second conversation scenario; respectively extracting audio feature information of each audio data, and respectively performing voice recognition on each audio data according to the audio feature information; when voice recognition of the audio data succeeds, determining a target user corresponding to the audio data; and updating voiceprint information of the target user according to audio feature information of at least one piece of audio data of the target user.

According to another aspect, a client comprises: an audio data acquiring unit, configured to acquire at least a first piece of audio data of a user in a first conversation scenario and at least a second piece of audio data of the user in a second conversation scenario, where voiceprint recognition is performed on the first and second pieces of audio data based on voiceprint information of the user; a feature information acquiring unit, configured to acquire audio feature information of the first and second pieces of audio data; and a voiceprint information update unit, configured to update the voiceprint information of the user according to the audio feature information.

According to another aspect, a computer storage medium is provided. The computer storage medium stores computer program instructions, and when the computer program instructions are executed, the following steps are performed: acquiring at least a first piece of audio data of a user in a first conversation scenario and at least a second piece of audio data of the user in a second conversation scenario, where voiceprint recognition is performed on the first and second pieces of audio data based on voiceprint information of the user; acquiring audio feature information of the first and second pieces of audio data; and updating the voiceprint information of the user according to the audio feature information.

According to another aspect, a client comprises: an audio data acquiring unit, configured to acquire at least a first piece of audio data of a user in a first conversation scenario and at least a second piece of audio data of the user in a second conversation scenario; a voice recognition unit, configured to: respectively extract audio feature information of each audio data, and respectively perform voice recognition on each audio data according to the audio feature information; a target user determining unit, configured to: when voice recognition of the audio data succeeds, determine a target user corresponding to the audio data; and a voiceprint information update unit, configured to update voiceprint information of the target user according to audio feature information of at least one piece of audio data of the target user.

According to another aspect, a computer storage medium is provided. The computer storage medium stores computer program instructions, and when the computer program instructions are executed, the following steps are performed: acquiring at least a first piece of audio data of a user in a first conversation scenario and at least a second piece of audio data of the user in a second conversation scenario; respectively extracting audio feature information of each audio data, and respectively performing voice recognition on each audio data according to the audio feature information; when voice recognition of the audio data succeeds, determining a target user corresponding to the audio data; and updating voiceprint information of the target user according to audio feature information of at least one piece of audio data of the target user.

According to another aspect, an electronic device is provided, including a microphone and a processor, where the microphone is configured to: record one or more conversations of a user in one or more conversation scenarios, and generate audio data of the conversations; and the processor is configured to: acquire at least a first piece of audio data of a user in the first conversation scenario and at least a second piece of audio data of the user in the second conversation scenario both obtained by voice recognition, where voice recognition is based on voiceprint information of the user; and acquire audio feature information of the first and second pieces of audio data, and update voiceprint information of the user according to the audio feature information.

According to another aspect, an electronic device is provided, including a microphone and a processor, where the microphone is configured to: record first and second conversations of a user in first and second conversation scenarios, and generate audio data of the conversations; and the processor is configured to: acquire at least a first piece of audio data of a user in the first conversation scenario and at least a second piece of audio data of the user in the second conversation scenario; respectively extract audio feature information of each audio data, and respectively perform voice recognition on each audio data according to the audio feature information; when voice recognition of the audio data succeeds, determine a target user corresponding to the audio data; and update voiceprint information of the target user according to audio feature information of at least one piece of audio data of the target user.

According to another aspect, a data update system comprises: a microphone configured to acquire at least a first piece of audio data of a user in a first conversation scenario and at least a second piece of audio data of the user in a second conversation scenario; and a processor and a non-transitory computer-readable storage medium storing instructions that, when executed by the processor, cause the system to perform a data update method, the method comprising: performing voiceprint recognition on the first and second pieces of audio data based on voiceprint information of the user; acquiring audio feature information of the first and second pieces of audio data; and updating the voiceprint information of the user according to the audio feature information.

According to another aspect, a data update system comprises: a microphone configured to acquire at least a first piece of audio data of a user in a first conversation scenario and at least a second piece of audio data of the user in a second conversation scenario; and a processor and a non-transitory computer-readable storage medium storing instructions that, when executed by the processor, cause the system to perform a data update method, the method comprising: respectively extracting audio feature information of the each piece of audio data, and respectively performing voice recognition on each audio data according to the audio feature information; when the voice recognition of the audio data succeeds, determining a target user corresponding to the audio data; and updating voiceprint information of the target user according to the audio feature information of at least one piece of the audio data of the target user.

In the data update method, the client, and the electronic device provided in this application, the voiceprint information of the user in a database may be updated by using the audio data of the user in conversation scenarios obtained by voiceprint recognition. Therefore, voiceprint information can also change along with a user voice feature change or an external environment change, to improve adaptability of the voiceprint information and a success rate of registration user voiceprint recognition. A recording device acquires conversations of the user in conversation scenarios when the user has not plainly sensed an audio feature update. Therefore, a manner of acquiring the audio feature information of the user may not restrict behaviors and activities of the user, and the time of the user is not wasted.

BRIEF DESCRIPTION OF THE DRAWINGS

To illustrate the technical solutions in the implementations of this disclosure more clearly, the accompanying drawings are briefly described in the following. Apparently, the accompanying drawings in the following descriptions merely show some of the implementations of this disclosure, and people of ordinary skill in the art may still derive other drawings from the accompanying drawings without creative efforts.

DETAILED DESCRIPTION

To make the technical solutions of this application more comprehensible for people skilled in the art, the technical solutions in the implementations of this application are clearly and completely described in the following with reference to the accompanying drawings. Apparently, the implementations to be described are merely a part rather than all of the implementations. All other implementations obtainable by people of ordinary skill in the art based on the disclosed implementations without making creative efforts shall fall within the protection scope of the present disclosure.

Figure 1:
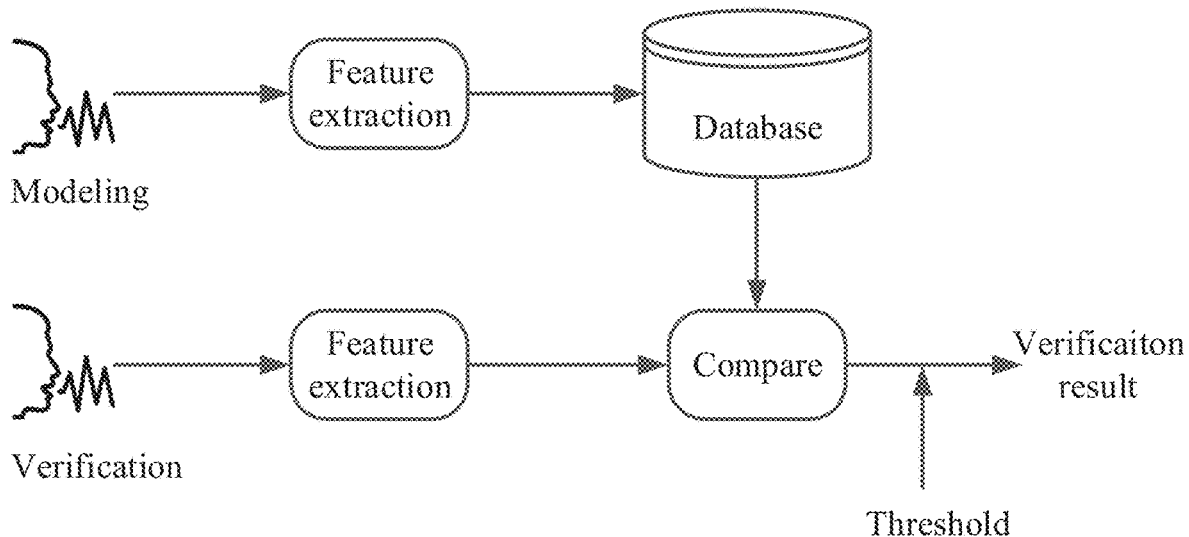
FIG. 1 is a basic principle diagram of a voiceprint recognition technology consistent with various embodiments of the present disclosure.

To enable a person skilled in the art to conveniently understand the technical solutions provided in the embodiments of this disclosure, the following first describes a technical environment for implementation of the technical solution by using FIG. 1.

FIG. 1 is a basic principle diagram of a voiceprint recognition consistent with various embodiments of the present disclosure. As shown in FIG. 1, a database is configured to store voiceprint information of each user, where the voiceprint information is used to uniquely identify a voice feature of the user. As shown in FIG. 1, to generate voiceprint information, modeling first needs to be performed according to audio data of a user. For example, the audio data of the user may be acquired, feature extraction is performed on the audio data of the user to extract audio feature information of the audio data, and the audio feature information is used as the voiceprint information of the user. In a verification process, the user enters an audio file, and feature extracted is also performed on the audio file entered by the user, to generate audio feature information of the audio file entered by the user. Subsequently, comparison processing may be performed on the audio feature information and the voiceprint information in the database, and a corresponding matching degree threshold is set. That is, only when a matching degree between the audio feature information and the voiceprint information in the database is greater than the matching degree threshold, it may be determined that the voice of the user has been recognized as a verification result; otherwise, recognition fails.

To at least mitigate the problems of existing technologies and consistent with the foregoing technical environment, data update methods and systems are disclosed. In some embodiments, when the audio feature information extracted from the audio data provided by the user during verification does not match the voiceprint information of the user stored in the database, the user's speech is unlikely to be recognized in a verification process. The reasons for the unsuccessful recognition mainly include the following two types.

(1) Change of personal circumstance. Physical conditions of the user affect the voice of the user. For example, when the user catches a cold, it often causes the voice feature of the user to change. For another example, emotions of the user can cause corresponding changes in rhythm, tempo, speed, intonation, and volume when the user speaks. Moreover, an age increase of the user also causes a voice feature change of the user. For example, the voice feature of the user may greatly change during the adolescence growing period. Changes of personal circumstance such as weight, accent, and pronunciation habit may all cause a voice feature change of the user.

(2) Change of external environment. When the environment for recording the user speech during modeling is different from the environment for recording the user speech during verification, it is likely that voice of the user cannot be recognized. For example, when the user performs verification in a noisy environment, surrounding noises from gaming, television, and square dance are all recorded in audio data for verification. It is likely that audio feature information obtained by performing feature extraction on the audio data containing noises fails verification.

For example, the user may perform a payment activity by using voice. That is, after a smart device (for example, a speaker, a band, or a mobile phone) recognizes the voice of the user, the smart device may determine identity information of the user, and may allow the user to make payment by using sound. In this scenario, if the audio feature information of the audio data entered by the user during verification is significantly different from the audio feature information obtained during modeling, the user may not be able to complete a payment activity, and this is a very poor usage experience for both the user and a business.

In some embodiments, a data update method is disclosed. For the method, the voiceprint information of the user in a database may be updated by using the audio data of the user in conversation scenarios obtained by voiceprint recognition. Therefore, voiceprint information can also change along with a user voice feature change or an external environment change, to improve adaptability of the voiceprint information and a success rate of user voiceprint recognition.

The disclosed methods can be implemented by various systems (e.g., a client). The client may comprise an electronic device having a recording function. For example, the client may comprise a desktop computer, a tablet computer, a notebook computer, a smartphone, a digital assistant, smart wearable device, a shop assisting terminal, a television, smart speaker, or a microphone. The smart wearable device includes, but is not limited to, a smart band, a smart watch, smart glasses, smart helmet, smart necklace, and the like. Alternatively or additionally, the client may comprise a software that can run on the electronic device. For example, the electronic device provides a recording function, and the software may record an audio file by invoking the recording function.

Figure 2:
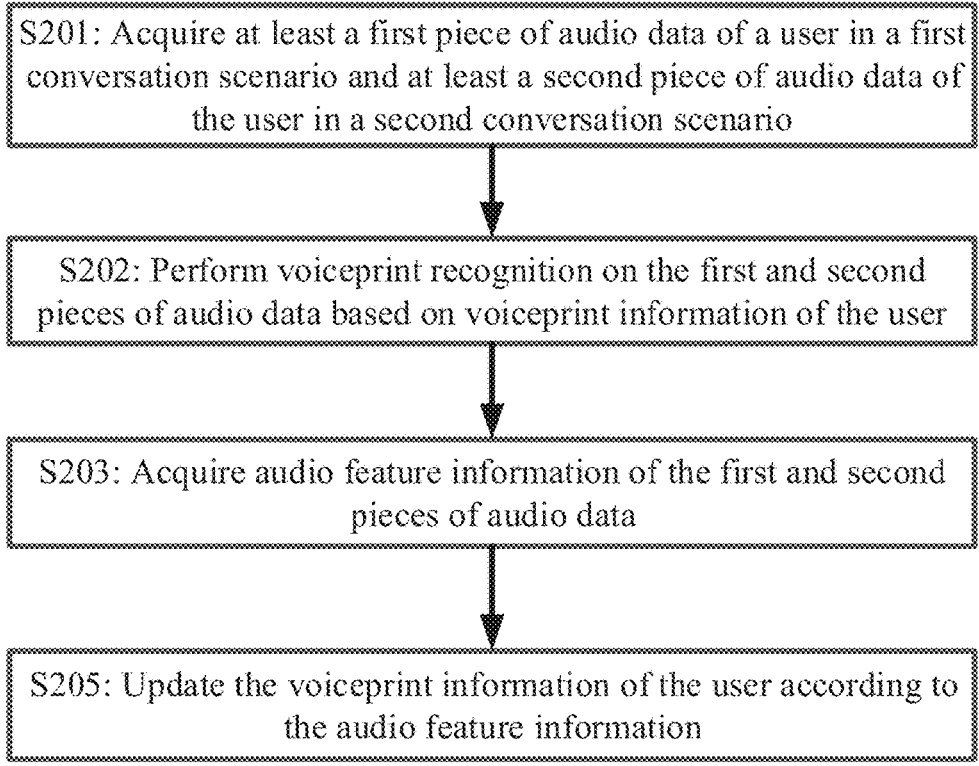
FIG. 2 is a method flowchart of a data update method consistent with various embodiments of the present disclosure.

FIG. 2 is a method flowchart of a data update method consistent with various embodiments of the present disclosure. The method may include more or less operation steps based on common work or without creative work. For steps having no necessary logical cause-effect relationship, an execution sequence of the steps is not limited to an execution sequence provided in the disclosed embodiments. In an exemplary data update process, the method may be executed according to the described method sequence or may be executed in parallel (for example, by a parallel-processor or in a multi-thread processing environment).

In some embodiments, the data update method may include:

S201: Acquire at least a first piece of audio data of a user in a first conversation scenario and at least a second piece of audio data of the user in a second conversation scenario.

S202: Perform voiceprint recognition on the first and second pieces of audio data based on voiceprint information of the user.

S203: Acquire audio feature information of the first and second pieces of audio data.

S205: Update the voiceprint information of the user according to the audio feature information.

In some embodiments, before step S205, the method further comprises: determining if voiceprint information matching the audio feature information exists; and in response to determining the voiceprint information matching the audio feature information, determining information of the user associated with the voiceprint information.

In some embodiments, the audio data in the conversation scenario may include audio data of the user in the conversation scenario recorded by a recording device. The audio data may include voice data of the user, or may include non-voice data. The non-voice data may comprise, for example, ambient sound data. In some embodiments, the voiceprint information may be updated by using the audio feature information of the audio data of the user in the conversation scenario. That is, when the user has no conscious awareness (for example, body perception, prompt, particular update operation), a conversation of the user in a conversation scenario is collected, and the voiceprint information of the user is updated by using the conversation. In some embodiments, the conversation scenario may include a daily conversation of the user, for example, face-to-face conversation between users, telephonic conversation, or personal reading or reciting by the user. The conversation scenario may further include a formal meeting, for example, an enterprise meeting.

In some existing technologies, the voice data of the user is usually acquired by instructing the user to speak a preset content after initiating the instruction. In this manner, the user usually needs to speak a specified sentence at a specified time and a specified place. However, in an actual conversation scenario, the conversation of the user is random and has no time and place limitation. Therefore, in this disclosure, by acquiring the conversation of the user in the conversation scenario with a recording device when the user has no conscious awareness, acquiring the audio feature information of the user does not limit behaviors and activities of the user, and the time of the user is not wasted.

In some embodiments, the voiceprint information may be used to identify the voice feature information of the user. The voice feature information may include information of one or more physical parameters of a sound. The physical parameters may include, for example, timbre, intonation, speech speed, rhythm, tempo, and volume of the voice of the user. The voice feature information may further include parameter information about the ambient sound when the user records. The voiceprint information may be acquired according to the audio feature information of the recorded audio data of the user, and the audio feature information of the audio data may be generated by performing feature extraction on the audio data. In some embodiments, feature extraction may be performed on the audio data in the following manner.

First, the audio data may be processed according to a preset algorithm, to generate a feature matrix including a feature of the audio data. The voice of the user has features, for example, timbre, intonation, speech speed, rhythm, tempo, and volume. After user speeches are recorded as audio data, each user's voice feature may correspond to different parameters such as frequency and amplitude in the audio data. Therefore, the feature matrix generated according to the preset algorithm may include feature information in the audio data. Therefore, a voice eigenvector generated by using the feature matrix may be used to represent the audio data. The preset algorithm may include MFCC (Mel Frequency Cepstrum Coefficient), MFSC (Mel Frequency Spectral Coefficient), FMFCC (Fractional Mel Frequency Cepstrum Coefficient), DMFCC (Discriminative Mel Frequency Cepstrum Coefficient), LPCC (Linear Prediction Cepstrum Coefficient), or the like. A person skilled in the art may further generate the feature matrix of the audio data based on the technical essence of this disclosure by using another algorithm. This shall fall within the protection scope of this disclosure as long as implementation functions and effects thereof are the same as or similar to that of this disclosure.

In some embodiments, dimensionality reduction processing may be further performed on the feature matrix according to different feature dimensions, to acquire a dimension value that may represent each feature dimension. Further, the voice eigenvector of the audio data may be formed by arranging dimension values according to a specified sequence. In some embodiments, dimensionality reduction processing may be performed on the feature matrix by using a convolution algorithm or a mapping algorithm. For example, dimensionality reduction processing may be performed on the feature matrix according to different dimensions by using DNN (Deep Neural Network), CNN (Convolutional Neural Network), RNN (Recurrent Neural Network), deep learning, reinforcement learning, or a combination of any algorithms thereof. This is not limited herein in this disclosure.

In some embodiments, to further distinguish user voice data and non-user voice (for example, ambient sound) data in the audio data, in the feature extraction process of the audio data, endpoint detection processing may be further performed on the audio data. Therefore, feature data corresponding to the non-user voice data can be reduced in the feature matrix, and an association between the generated voice eigenvector and the user can be improved. An endpoint detection processing method may include, but is not limited to, endpoint detection based on energy, endpoint detection based on cepstral feature, endpoint detection based on information entropy, endpoint detection based on an associated similar distance thereof, and the like.

In some embodiments, the voiceprint information used to identify the voice feature of the user may be determined according to the acquired voice eigenvector. For example, if only one voice eigenvector is generated, the voice eigenvector may be used as the voiceprint information of the user. If multiple voice eigenvectors are generated, a voice eigenvector that better represents the voice feature of the user may be selected from the multiple voice eigenvectors, to serve as the voiceprint information of the user. If multiple voice eigenvectors are generated, further operation processing may be performed on some or all of the multiple voice eigenvectors, to output the voiceprint information of the user. The operation processing may include, but is not limited to: after corresponding dimension summation is performed on the multiple voice eigenvectors, calculating an average value. Other algorithms, for example, cluster analysis may be alternatively used.

If the user needs to perform voiceprint recognition, voice registration may be performed, for example, in the modeling process in FIG. 1. In some embodiments, the voiceprint information of the user and personal information of the user may be associated to complete user voice registration. The personal information of the user may include information for uniquely identifying the user, and includes, but is not limited to: user name, nickname, real name, gender, identification card number, contact telephone number, communication address, and the like. By associating the voiceprint information and the personal information of the user, a voice eigenvector of the collected audio data of the user speech may be calculated, and the personal information of the user is determined according to the association between the voice eigenvector and the voiceprint information.

Figure 3:
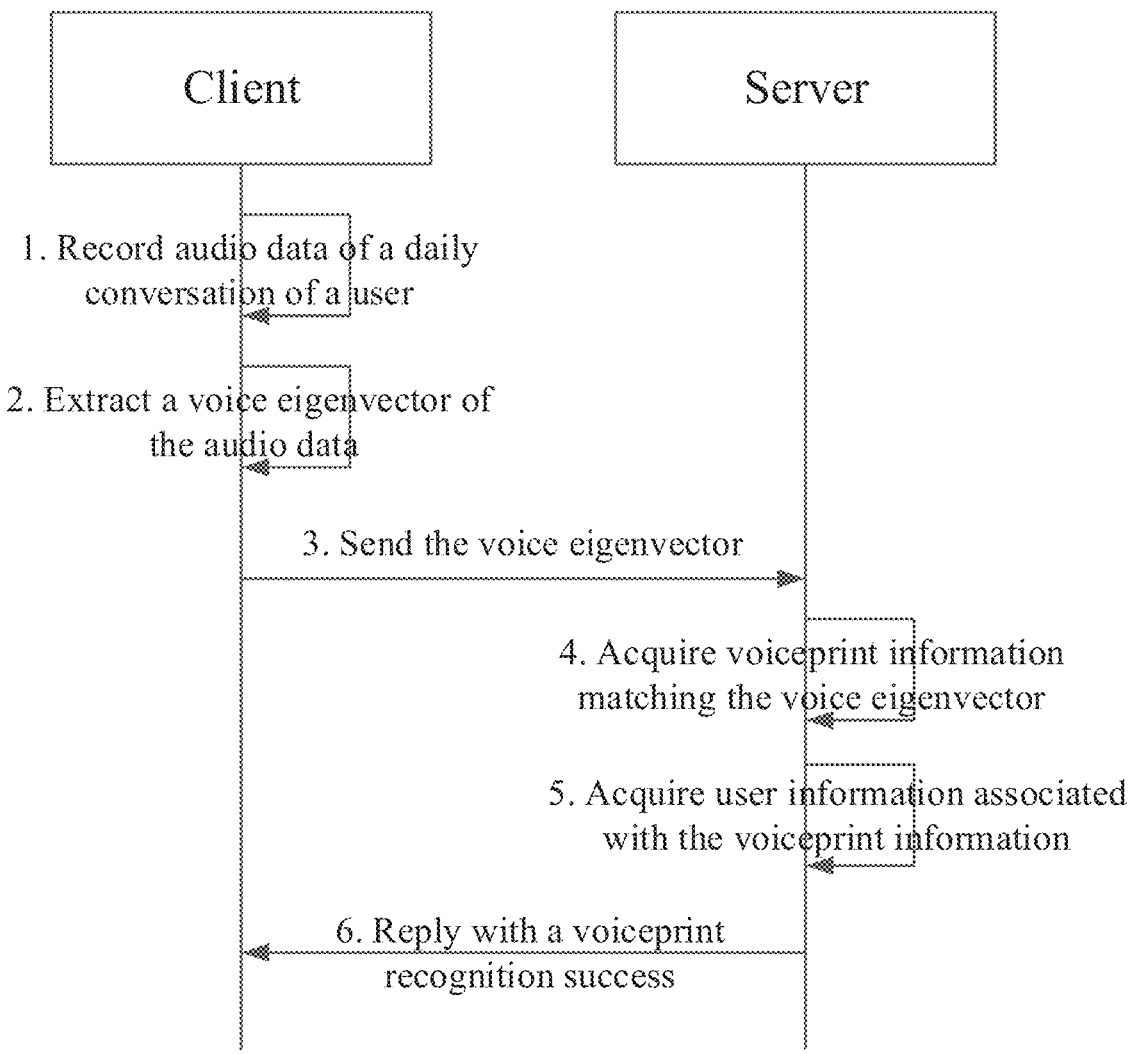
FIG. 3 is an interaction flowchart of voice recognition consistent with various embodiments of the present disclosure.

In some embodiments, the server may verify whether the audio data of the user speech succeeded voiceprint recognition. As shown in FIG. 3, in some embodiments, the client may send the recorded audio data of the user in a daily conversation or the voice eigenvector generated according to the audio data to the server. After the server receives the voice eigenvector, the server determines whether voiceprint information matching the voice eigenvector exists. If the voiceprint information matching the voice eigenvector exists, the server acquires the voiceprint information, acquires user information associated with the voiceprint information, and notifies the client in a voiceprint recognition success confirmation message. Alternatively, the client may verify whether the audio data of the user succeeded voiceprint recognition, and the client may match the voice eigenvector with the voiceprint information, and determine the personal information of the user.

In some embodiments, the server may comprise an electronic device having an operation processing capability. The server may comprise a network communications terminal, a processor, a storage, and the like. Alternatively or additionally, the server may comprise a software running in the electronic device. The server may be further a distributed server, or may be a system in which multiple processors, a storage, a network communications module, and the like operate in coordination. Alternatively, the server may be further a server cluster formed by several servers.

In some embodiments, the server may be further configured to manage the voiceprint information of the user. After the user completes registration, the voiceprint information of the user may be stored in the server. After the server receives the audio data provided by the client, the server may generate the voice eigenvector of the audio data. Matching is performed between the voice eigenvector and voiceprint information to obtain target voiceprint information. A user identity is determined according to personal information associated with the target voiceprint information. Alternatively, the server receives the voice eigenvector provided by the client, performs matching between the voice eigenvector and voiceprint information to obtain target voiceprint information, and determines a user identity according to personal information associated with the target voiceprint information.

In some embodiments, a recording device may monitor the conversations of the user in the multiple (e.g., a first and a second) conversation scenarios in real time, and when detecting speech voice of the user from the surrounding environment, record a conversation sentence of the user of a particular duration, or a complete conversation sentence spoken by the user, or a conversation sentence spoken by the user before detecting a different user speaking. Voiceprint recognition can be performed on the audio data of the conversation sentence by using the voiceprint recognition methods provided in the foregoing embodiments. If the voiceprint information matching the audio feature information (that is, the voice eigenvector) of the audio data can be acquired, it may be determined that voiceprint recognition of the audio data of the user succeeded, and user identity information of the speaker is determined. In some embodiments, the audio data of the user obtained by voiceprint recognition from conversations of the user in multiple (e.g., the first and second) conversation scenarios may be acquired, audio feature information of each audio data may be respectively extracted, and the voiceprint information of the user may be updated according to the audio feature information.

In some embodiments, when the audio feature information of the audio data is acquired, the client may acquire only audio feature information of audio data of the user succeeded in voice recognition, and update the voiceprint information of the user according to the audio feature information at an update trigger time point. In some embodiments, first and second pieces of audio data in the first and second conversation scenarios may be first acquired respectively, and audio feature information of each audio data is respectively extracted at a trigger time point (for example, every one month). Voice recognition is then respectively performed on each audio data according to the audio feature information, and when voice recognition of the audio data succeeds, a target user corresponding to the audio data is determined. Subsequently, voiceprint information update is respectively performed for each user.

In some embodiments, for updating the voiceprint information of the user according to the audio feature information, the voiceprint information generation method can be referred to. For example, if there is only one piece of audio feature information, the voiceprint information of the user may be updated to the audio feature information. If there are multiple pieces of audio feature information, audio feature information that better represents the voice feature of the user may be selected from the multiple pieces of audio feature information, and the voiceprint information of the user is updated to the audio feature information. If multiple pieces of audio feature information are generated, further operation processing may be performed on some or all of the multiple pieces of audio feature information, to be outputted as the voiceprint information of the user. The operation processing may include, but is not limited to: after corresponding dimension summation is performed on the multiple pieces of audio feature information, calculating an average value. Other algorithms, for example, cluster analysis may be alternatively used.

In some embodiments, the time point of updating the voiceprint information of the user can be determined in various ways. In one example, the voiceprint information of the user may be updated according to a preset time frequency, such as every one week, half month, one month, 25 days, or in other time periods. In another example, the audio feature information of the user may be stored. When an amount of the stored audio feature information of the user reaches a first threshold, update of the voiceprint information of the user may be triggered. For example, when the amount of the stored audio feature information of the user reaches 30 pieces, update of the voiceprint information of the user may be triggered. In another embodiment, a preset data set for storing the audio feature information of the user may be further provided, and when a total amount of the audio feature information in the preset data set reaches a third threshold, update of the voiceprint information of the user may be triggered. For example, a family smart speaker is provided with a storage dedicated for storing the audio feature information of the user obtained by voiceprint recognition, where the user may include all family members. For example, when a total amount of the audio feature information stored in the storage reaches 200 pieces, update of the voiceprint information of the user may be triggered. In some embodiments, the user may define an update time point. For example, the user may set an update period, such as, one month, 27 days, and the like.

In some embodiments, before the update, the matching degree between the audio feature information and the voiceprint information of the user may be further calculated. Even though voice verification of the audio data of the user succeeds (that is, the matching degree is greater than a preset threshold), different audio data has different matching degrees because the voice feature has a dynamic range. For example, it can be set that when the matching degree between the audio feature information and the voiceprint information of the user is greater than 95%, the audio feature information is determined to match the voiceprint information of the user. The matching degree between the two may be any value in the range greater than 95%. Before update, if it is found that the matching degree between the audio feature information and the voiceprint information of the user is greater than a threshold (for example, 99%), it may be determined that the voice feature of the user has not changed recently, and is not affected by ambient sound. Therefore, the audio feature information of the recorded audio data does not change significantly either. In this case, the voiceprint information of the user may not need to be updated. Therefore, in some embodiments, the matching degree between the audio feature information and the voiceprint information of the user may be calculated. If the matching degree is not greater than a fourth threshold, the voiceprint information of the user is updated; otherwise, the voiceprint information of the user does not need to be updated.

In some embodiments, after the voiceprint information of the user is updated, the most recently extracted audio feature information corresponding to the user and the voiceprint information existing before the update may be further acquired. Matching degrees between the most recently extracted audio feature information existing after the update and each of the voiceprint information existing before and after the update are respectively calculated. If the matching degree between the most recently extracted audio feature information existing after the update and the voiceprint information existing before the update is greater than the matching degree between the most recently extracted audio feature information existing after the update and the voiceprint information existing after the update, the voiceprint information of the user is restored to the voiceprint information existing before the update. In one example, if the user catches cold, causing the voice feature of the user to significantly change, the audio feature information extracted from the recorded audio data of the conversation in the multiple conversation scenarios by the user is greatly different from the historical audio feature information. If the client updates the voiceprint information every week, after the voiceprint information is updated according to the audio feature information acquired when the user catches a cold, the voiceprint information existing after the update may be greatly different from the historical voiceprint information. If the user recovers from the cold after updating the voiceprint information, and the voice feature restores to the original condition, the matching degree between the audio feature information of the audio data recorded by the user and the voiceprint information existing after the update may decrease. If it is found that the matching degree between the audio feature information and the voiceprint information existing after the update decreases, the voiceprint information may be restored to the voiceprint information existing before the update. Accordingly, a high matching degree can be ensured between the audio feature information and the voiceprint information existing after the update, and avoids having the user voice unrecognized.

Figure 4:
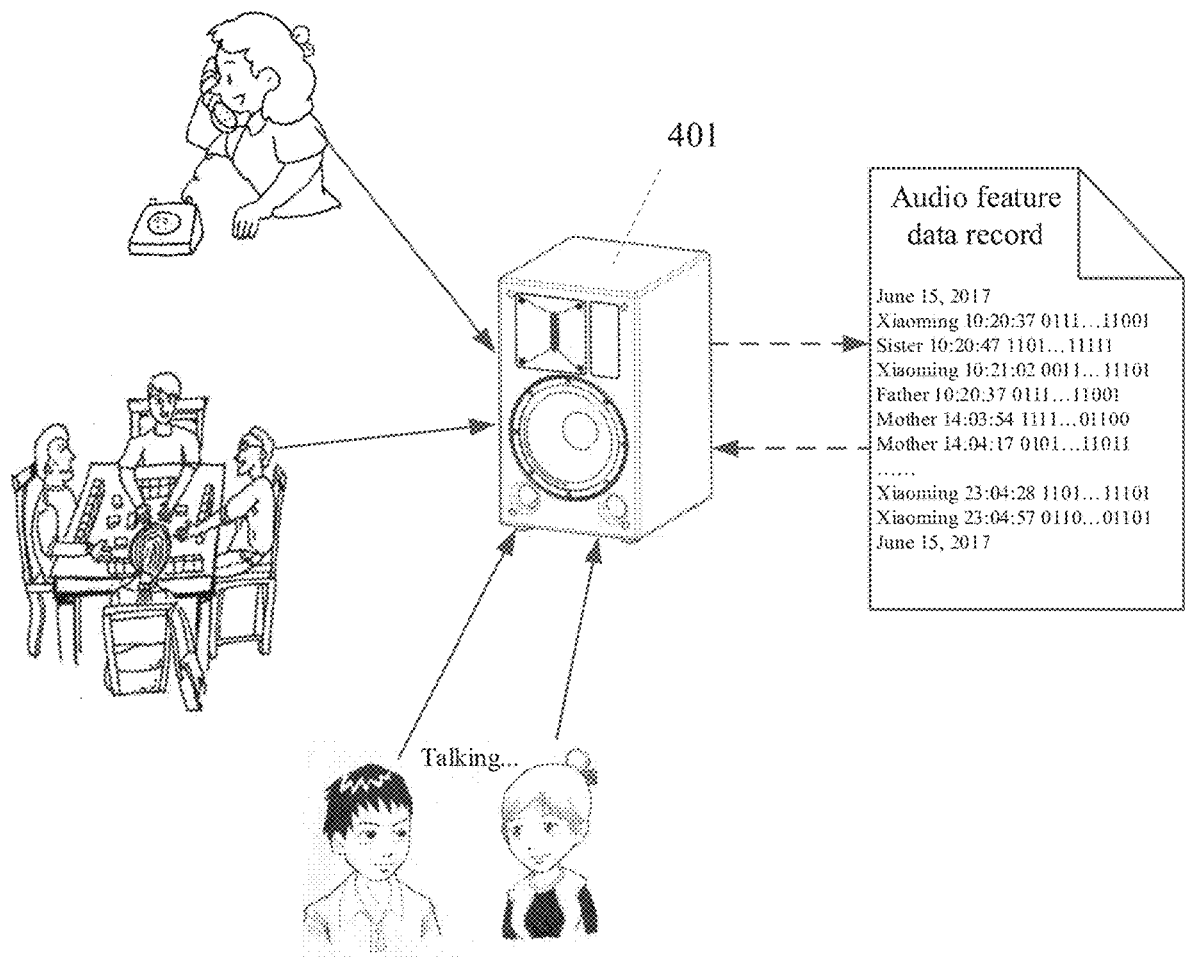
FIG. 4 is a schematic diagram of an application scenario consistent with various embodiments of the present disclosure.

The following describes the method in the foregoing embodiments with reference to FIG. 4 with reference to an application scenario.

The household of a user Xiaoming buys a smart sound box 401. The smart sound box 401 not only plays music, but also can implement multiple functions, for example, connecting to another client to play music on the client, and further has functions such as making payment, alarm clock alert, weather prediction, and controlling other home devices. When the smart sound box 401 performs some interaction activities with the user, the smart sound box 401 needs to determine an identity of the user by using voiceprint recognition. The interaction activities comprise, for example, making payment and personal music library login. When the user needs to pay or log into a music library as a member or the like, the user may awaken the smart sound box 401 by using a preset password. The smart sound box 401 may recognize the identity of the user based on a voiceprint of the user, and allow the user to use voice to make payment, perform login, and the like. In the Xiaoming family, Xiaoming, his father, his mother, and his sister all have their own payment accounts, member accounts, and the like, and may all pay, log into a personal music library, or the like by using the smart sound box 401. When the smart sound box 401 performs registration for family members of Xiaoming, the smart sound box 401 may respectively perform sound modeling for each member, acquire voiceprint information of each member, and associate the voiceprint information with user information of each member, where the user information may include account information, a sound box password, and the like for each member.

The smart sound box 401 includes a microphone, and the smart sound box 401 may monitor audio data of daily conversations of each family member by using the microphone. As shown in FIG. 4, in a monitoring process, the family members may perform their own activities, audio data of daily conversations of the members is recorded without the family members' awareness. For example, when the mother is making a call, the father is playing Mahjong, and Xiaoming and the sister are talking, or the sister is reciting texts, the smart sound box 401 may record the audio data of each member in the background. After the smart sound box 401 records the audio data, the audio feature information of the audio data may be extracted, the recorded audio data of the daily conversation of the each user is recognized according to the audio feature information, to determine whether voiceprint recognition succeeds, and if voiceprint recognition succeeds, identity information of the speaker is determined.

The smart sound box 401 further includes a storage, and the storage may be configured to store the audio feature information of the audio data of each family member obtained by voiceprint recognition. As shown in FIG. 4, during storage, the storage may store an audio feature information recording file 403, and the recording file 403 may record the audio feature information of each registration user in a format of a user identifier, a recording moment, and audio feature binary data. For example, a conversation of the brother Xiaoming is recognized at 10:20:37, Jun. 15, 2017, and a corresponding record is added to the audio feature information record. The smart sound box 401 may respectively update, by default, the voiceprint information of each family member every month according to the audio feature information stored in the storage, to maintain adaptability of the voiceprint information, and improve the matching degree between the audio feature information of the audio data of each member and the voiceprint information.

In some embodiments, Xiaoming is 15 years old and is in a growing and voice-changing phase. His voice feature may greatly change within one or two months. In this case, when Xiaoming performs a conversation each time, if the voiceprint recognition of the voice of Xiaoming succeeds, the smart sound box 401 may store, in the background, the audio feature information extracted from the voice of Xiaoming, and update the voiceprint information of Xiaoming every month. In this way, although the voice feature of Xiaoming changes, the smart sound box 401 may update the voiceprint information according to recent audio feature information of Xiaoming, to avoid the situation that Xiaoming cannot pass identity verification because of his bodily development and sound changing.

In some embodiments, the sister of Xiaoming is on a summer vacation, and during the summer vacation, she likes to play video games. Consequently, game volume may permeate the living room where the smart sound box 401 is disposed. Therefore, when each family member uses the smart sound box 401 to perform voiceprint recognition, it is likely that the audio data recorded during verification is blended with the game volume. If the smart sound box 401 does not update the voiceprint information of each family member, it is likely that voiceprint recognition is difficult or even fails. In some embodiments, the smart sound box 401 may update the voiceprint information of each family member according to the audio feature information of the audio data blended with the game volume, so that the voiceprint information "adapts to" the game volume environment, to improve voiceprint recognition accuracy and a payment success rate. After the sister goes to school, the living room settles to a quiet environment, and the smart sound box 401 may update the voiceprint information of each family member again, so that the voiceprint information "adapts to" a quiet environment.

Figure 5:
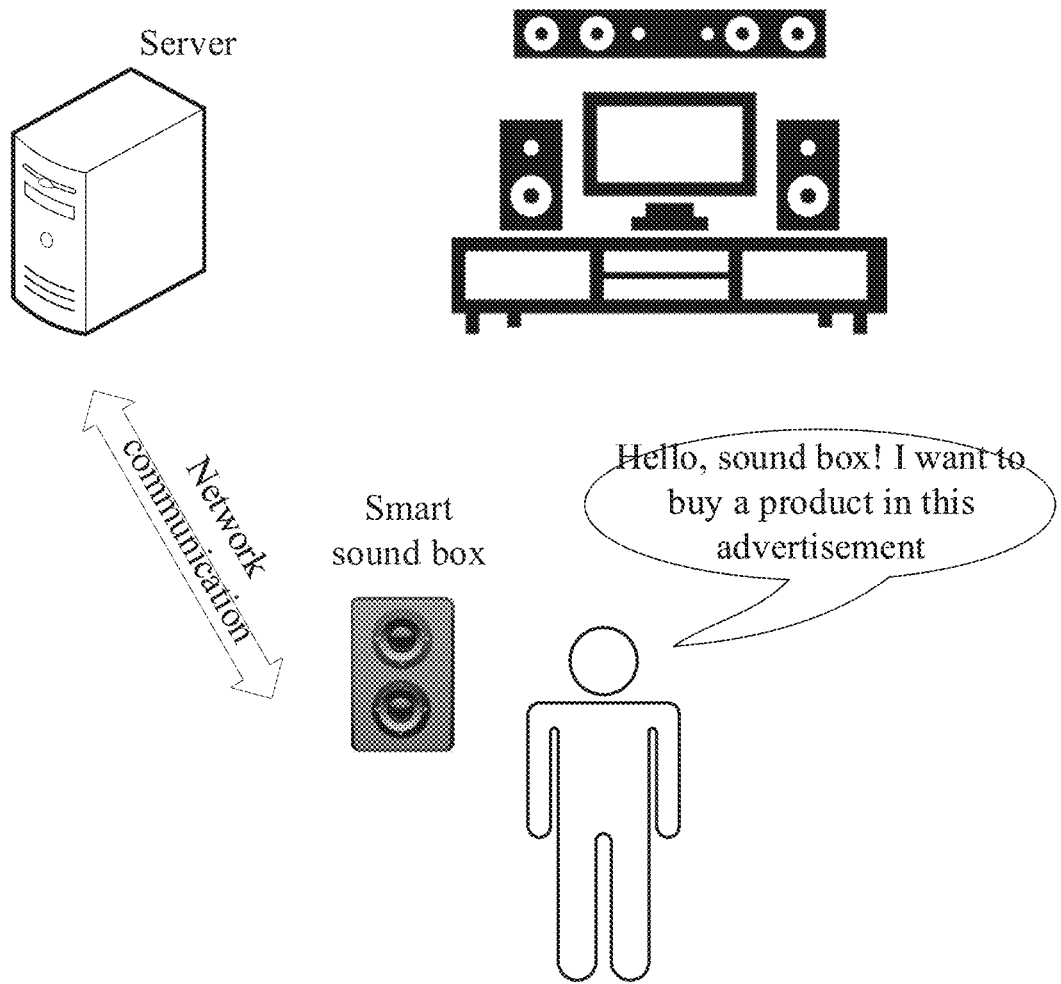
FIG. 5 is a schematic diagram of an application scenario consistent with various embodiments of the present disclosure.

FIG. 5 shows a usage scenario of the smart sound box in the household of Xiaoming consistent with various embodiments of the present disclosure. In some embodiments, the smart sound box may be located in the living room of the household of the user. When the user watches the television, the smart sound box may acquire audio information by recording television sound, and identify channel codes. Alternatively, the smart sound box may interact with a server by identifying contents of a television program, and the server feeds back a corresponding television channel code.

In some embodiments, the smart sound box may store a program list of a television channel. Alternatively, a program list of a television channel may be obtained from the server. When the user watches the television, the user may be interested in a product in an advertisement and want to buy the product. In this case, the user may say: "hello, sound box, I want to buy the product in this advertisement." The smart sound box may determine, according to a speaking time point of the user and a time provided in the program list, information about the product that the user wants to buy. Further, the smart sound box may generate a voice feature file according to audio information of the voice of the user to perform matching, and verify the identity of the user. When verification succeeds, personal information of the user and product information are sent to the server, so that the server pays the price in the product information from a financial account of the user to a seller of the product.

Figure 6:
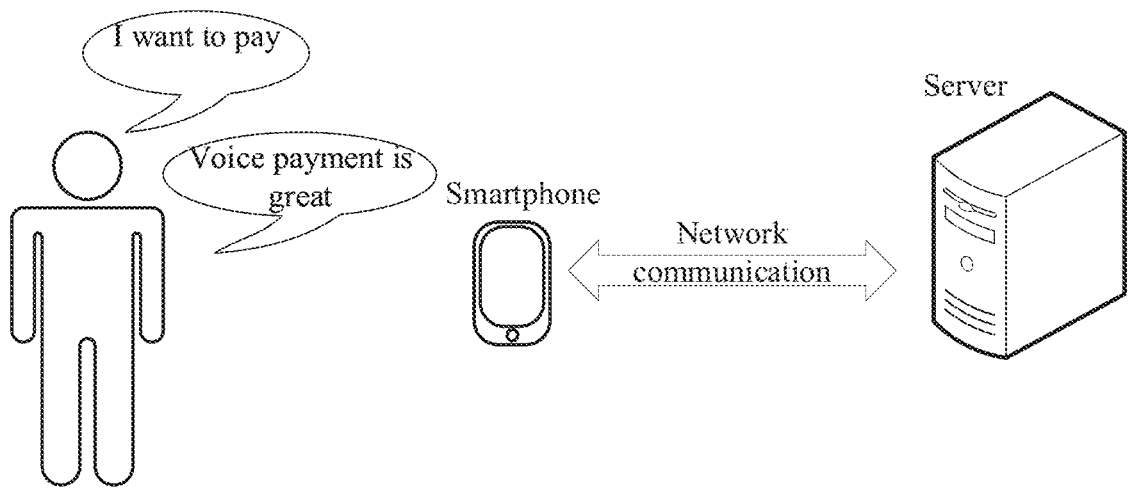
FIG. 6 is a schematic diagram of an application scenario consistent with various embodiments of the present disclosure.

FIG. 6 shows another usage scenario consistent with various embodiments of the present disclosure. In some embodiments, the client may be an electronic device comprising a display. For example, the client may be a type 4 device in Table 1 described below. For example, the client may comprise a smartphone.

In some embodiments, the user may want to buy a headset. The user may use a shopping software, for example, a mobile phone Application Jingdong, Dangdang, or Amazon, to operate and browse product information.

In some embodiments, when the user is about to pay for a headset at a price of 150 yuan after browsing the product information, the user may let mobile phone display stay at the product information, and speak to the mobile phone: "I want to pay." In this case, the mobile phone may record the audio and identify the audio to obtain an instruction of the user, and then the mobile phone may provide a payment interface to the user. Alternatively, the user clicks a payment button, and the mobile phone provides the payment interface. On the payment interface, the user may directly say a preset payment keyword. For example, the user says: "voiceprint payment manner brings convenience to life," and the mobile phone performs recording and generates audio information, and may generate a voice eigenvector according to the audio information. Matching between the voice eigenvector and a user eigenvector stored in the mobile phone is performed, to verify the identity of the user. When the matching succeeds, the mobile phone may send personal information of the user and the product information to the server, so that the server pays the price in the product information from a financial account of the user to the seller of the product.

Figure 7:
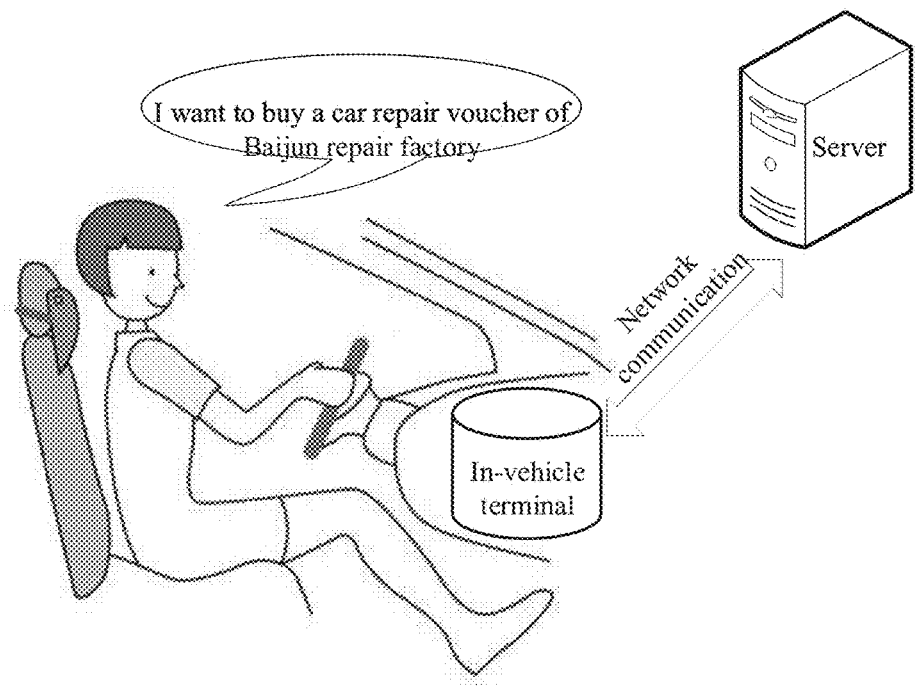
FIG. 7 is a schematic diagram of an application scenario consistent with various embodiments of the present disclosure.

FIG. 7 shows another usage scenario consistent with various embodiments of the present disclosure. In some embodiments, the client may comprise an in-vehicle terminal. By communicating with the user, the in-vehicle terminal may further determine that the user wants to buy a service coupon, for example, a car repair coupon worth RMB 50. The in-vehicle terminal may send both the recorded voice file of the user and information about the car repair coupon to the server. The server performs an identity verification process.

In some embodiments, audio information provided by the in-vehicle terminal to the server may be a recording of a buying instruction of the user. For example, the user says: "I want to buy a car repair hour coupon of Baijun repair factory", and the in-vehicle terminal sends audio information of this sentence to the server.

In some embodiments, after the server receives audio information and service information, the server may generate a voice eigenvector according to the audio information. Matching between the voice eigenvector and a user eigenvector in the server is performed, to verify the identity of the user. For example, if verification succeeds, personal information of the user is acquired according to the successfully matched user eigenvector, and the financial account in the personal information may transact with the Baijun repair factory to make the car repair coupon purchase.

In some embodiments, the in-vehicle terminal may generate a feature matrix of audio information after recording audio information, and send the feature matrix and service information to the server. In this way, the server conveniently generates a voice eigenvector according to the feature matrix to verify the identity of the user.

In some embodiments, the client may be an electronic device having a recording function. Clients may be categorized into the following types according to different client data processing capabilities.

TABLE 1

| Type number | Type name | Exemplary device | Data processing capability |
|---|---|---|---|
| 1 | Basic network device | Internet of Things device and boundary node device | Data collection and sending |
| 2 | Simple network device | Smart wearable device and POS (point of sale) machine | Data collection and sending, and simple data preprocessing |
| 3 | Intermediate network device | Smart home appliance and smart sound box | Data collection and sending, and data preprocessing with intermediate power consumption |
| 4 | Intelligent network device | Smart mobile phone and tablet computer with desirable performance | Data collection and sending, data preprocessing, and data query and matching with high power consumption |
| 5 | High-performance device | Working station and smart telephone booth | Data collection and sending, data preprocessing, data query and matching, and data storage |

In some embodiments, a hardware device of the basic network device is relatively simple, and may perform recording to generate audio information by using a microphone. The generated audio information is sent to the server by using a network communications module. The basic network device may include a microphone, a network communications unit, a sensor, and a speaker. The basic network device may not need to process data. The basic network device may be further provided with other sensors configured to collect a working parameter of the basic network device. For example, the basic network device may comprise an Internet of Things device, a boundary node device, and the like.

In some embodiments, the simple network device may include: a microphone, a network communications unit, a processor, a storage, a speaker, or the like. The simple network device enhances a data processing capability compared with the basic network device. The simple network device may comprise a processor that can process a simple logical operation, so that after the simple network device collects data, the simple network device may perform preliminary data preprocessing, such as generating a feature matrix according to audio information. The simple network device may comprise a display module having a simple display function, which may be configured to feedback information to the user. For example, the simple network device may be a smart wearable device, a POS (point of sale) machine, and the like, such as a smart band, a basic smart watch, smart glasses, a settlement device (for example, a POS machine) at an offline shopping place, a mobile settlement device (for example, a handheld POS machine, and a settlement module attached to the handheld device), and the like.

In some embodiments, the intermediate network device may include a microphone, a network communications unit, a processor, a storage, a display, a speaker, and the like. A clock rate of the processor of the intermediate network device may be less than 2.0 GHz, a memory capacity may be less than 2 GB, and a capacity of the storage may be less than 128 GB. The intermediate network device may process the recorded audio information, for example, generating a feature matrix and performing endpoint detection processing, noise reduction processing, voice recognition, and the like on the feature matrix. For example, the intermediate network device may include: a smart home appliance of smart home, a smart household terminal, a smart sound box, an advanced smart watch, a basic smartphone (for example, worth around 1000 Yuan), and an in-vehicle smart terminal.

In some embodiments, the intelligent network device may include a hardware such as a microphone, a network communications unit, a processor, a storage, a display, and a speaker. The intelligent network device may have a strong data processing capability. A clock rate of the processor of the intelligent network device may be greater than 2.0 GHz, a memory capacity may be less than 12 GB, and a capacity of the storage may be less than 1 TB. After a feature matrix is generated for audio information, endpoint detection processing, noise reduction processing, voice recognition, and the like may be performed on the feature matrix. Further, the intelligent network device may further generate a voice eigenvector according to the audio information. In some cases, matching between the voice eigenvector and a user eigenvector may be performed to recognize the identity of the user. But the matching is limited to a certain quantity of user eigenvectors, for example, user eigenvectors of family members in a family. For example, the intelligent network device may include: a smartphone, a tablet computer, a desktop computer, a notebook computer, and the like having desirable performances.

In some embodiments, a high-performance device may include hardware such as a microphone, a network communications unit, a processor, a storage, a display, and a speaker. The high-performance device may have a strong data operation processing capability, and may further provide a strong data storage capability. A clock rate of the processor of the high-performance device may be above 3.0 GHz, a memory capacity may be greater than 12 GB, and a capacity of the storage may be above 1 TB. The high-performance device may generate a feature matrix for audio information, perform endpoint detection processing, noise reduction processing, voice recognition, and the like, generate a voice eigenvector, and perform matching between the voice eigenvector and many stored user eigenvectors. For example, the high-performance device may comprise a working station, a desktop computer with a very high configuration, a Kiosk smart telephone booth, a self-service machine, and the like.

The foregoing exemplarily lists some clients. With advancement of science and technologies, performance of hardware devices may improve, so that existing electronic devices having a weak data processing capability may also have a strong processing capability in future. Therefore, in the following implementations, contents of Table 1 are cited only as exemplary references, which constitute no limitation.

The five types of hardware in Table 1 all can execute the foregoing data update and optimizing method.

In some embodiments, the client may include: an audio data acquiring unit configured to acquire at least a first piece of audio data of a user in a first conversation scenario and at least a second piece of audio data of the user in a second conversation scenario, and voiceprint recognition is performed on the first and second pieces of audio data based on voiceprint information of the user; a feature information acquiring unit configured to acquire audio feature information of the first and second pieces of audio data; and a voiceprint information update unit configured to update the voiceprint information of the user according to the audio feature information.

In some embodiments, the client may include: an audio data acquiring unit configured to acquire at least a first piece of audio data of a user in a first conversation scenario and at least a second piece of audio data of the user in a second conversation scenario; a voice recognition unit configured to: respectively extract audio feature information of each audio data, and respectively perform voice recognition on each audio data according to the audio feature information; a target user determining unit configured to: when voice recognition of the audio data succeeds, determine a target user corresponding to the audio data; and a voiceprint information update unit configured to update voiceprint information of the target user according to audio feature information of at least one piece of audio data of the target user.

This disclosure further provides a computer storage medium, where the computer storage medium stores computer program instructions, and when the computer program instructions are executed, the following steps may be performed: acquiring at least a first piece of audio data of a user in a first conversation scenario and at least a second piece of audio data of the user in a second conversation scenario, performing voiceprint recognition on the first and second pieces of audio data based on voiceprint information of the user; acquiring audio feature information of the first and second pieces of audio data; and updating the voiceprint information of the user according to the audio feature information.

This disclosure further provides a computer storage medium, where the computer storage medium stores computer program instructions, and when the computer program instructions are executed, the following steps are performed: acquiring at least a first piece of audio data of a user in a first conversation scenario and at least a second piece of audio data of the user in a second conversation scenario; respectively extracting audio feature information of each audio data, and respectively performing voice recognition on each audio data according to the audio feature information; when voice recognition of the audio data succeeds, determining a target user corresponding to the audio data; and updating voiceprint information of the target user according to audio feature information of at least one piece of audio data of the target user.

In some embodiments, the computer storage medium includes, but is not limited to, a random access storage (RAM), a read-only storage (ROM), a cache, a hard disk drive (HDD), or a storage card.

Figure 8:
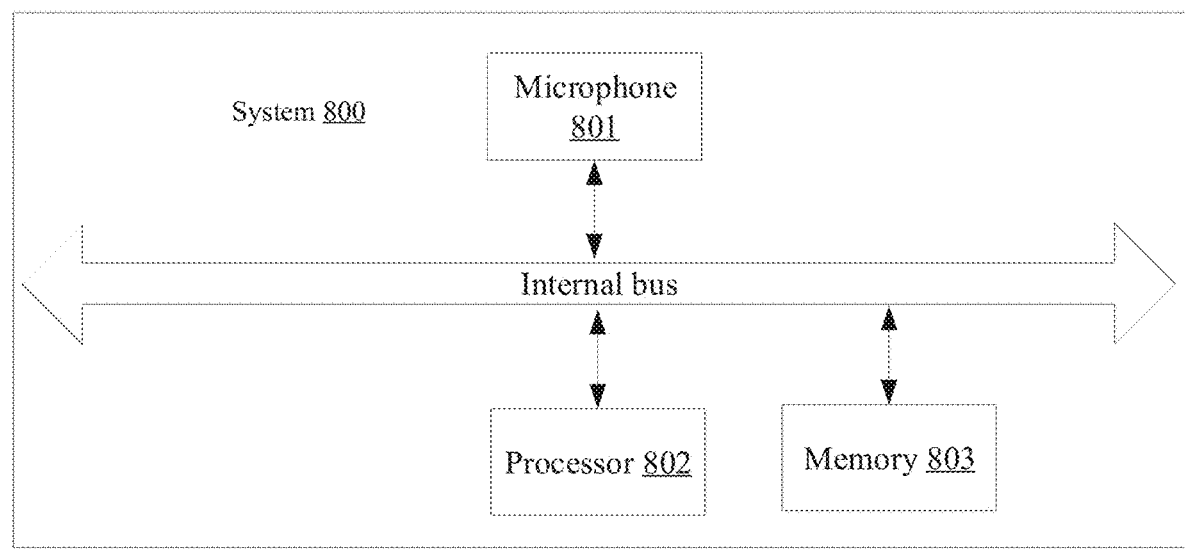
FIG. 8 is a schematic structural diagram of a data update system according to various embodiments of the present disclosure.

Referring to FIG. 8, this disclosure further provides a data update system 800. The data update system 800 may include a microphone 801, a processor 802, and a memory 803 (e.g., a non-transitory computer-readable storage medium). Various modules and units described herein may be implemented as instructions stored in the memory and executable by the processor.

In some embodiments, the microphone 801 is configured to acquire at least a first piece of audio data of a user in a first conversation scenario and at least a second piece of audio data of the user in a second conversation scenario. The non-transitory computer-readable storage medium 803 may store instructions that, when executed by the processor 802, cause the system 800 to perform a data update method, the method comprising: performing voiceprint recognition on the first and second pieces of audio data based on voiceprint information of the user; acquiring audio feature information of the first and second pieces of audio data; and updating the voiceprint information of the user according to the audio feature information. The method may include various other data update steps and methods described herein.

In some embodiments, the microphone 801 is configured to acquire at least a first piece of audio data of a user in a first conversation scenario and at least a second piece of audio data of the user in a second conversation scenario. The non-transitory computer-readable storage medium 803 may store instructions that, when executed by the processor 802, cause the system 800 to perform a data update method, the method comprising: respectively extracting audio feature information of the each piece of audio data, and respectively performing voice recognition on each audio data according to the audio feature information; when the voice recognition of the audio data succeeds, determining a target user corresponding to the audio data; and updating voiceprint information of the target user according to the audio feature information of at least one piece of the audio data of the target user. The method may include various other data update steps and methods described herein.

In some embodiments, the microphone 801 is configured to: record first and second conversations of a user in first and second conversation scenarios, and generate audio data of the conversations; and the processor is configured to: acquire at least a first piece of audio data of a user in the first conversation scenario and at least a second piece of audio data of the user in the second conversation scenario both obtained by voice recognition, where voice recognition is based on voiceprint information of the user; and acquire audio feature information of the first and second pieces of audio data, and update voiceprint information of the user according to the audio feature information.

The system 800 may be implemented as various electronic devices such as a server, a client (e.g., mobile phone, computer, sound box, speaker, or any other appliance, etc.). This disclosure further provides an electronic device, including a microphone and a processor. The microphone is configured to: monitor first and second conversations of a user in first and second conversation scenarios, and generate audio data of the conversations; and the processor is configured to: acquire at least a first piece of audio data of a user in a first conversation scenario and at least a second piece of audio data of the user in a second conversation scenario; respectively extract audio feature information of each audio data, and respectively perform voice recognition on each audio data according to the audio feature information; when voice recognition of the audio data succeeds, determine a target user corresponding to the audio data; and update voiceprint information of the target user according to audio feature information of at least one piece of audio data of the target user.

In some embodiments, the processor may be implemented in any form. For example, the processor may comprise, for example, a microprocessor or a processor and a computer readable medium storing computer readable program code (for example, software or firmware) that may be executed by the (microprocessor) processor, a logical gate, a switch, an application specific integrated circuit (ASIC), a programmable logical controller, and a built-in microcontroller.

In some embodiments, the microphone may convert sound into an electrical signal to form an audio file. A resistive microphone, an inductive microphone, a condenser microphone, a ribbon microphone, a dynamic microphone, or an electret microphone may be used as the microphone.

For the server, in the nineties of the 20th century, whether a technical improvement is an improvement in hardware (for example, an improvement in a circuit structure such as a diode, a transistor, or a switch) or an improvement in software (an improvement in a method process) may be quite obviously distinguished. However, with development of technologies, many current improvements in method processes may be considered as direct improvements in hardware circuit structures. Almost all designers obtain a corresponding hardware circuit structure by programming an improved method process into a hardware circuit. Therefore, an improvement in a method process may be implemented by using a hardware entity module. For example, a programmable logic device (PLD) (such as a field programmable gate array (FPGA)) is such an integrated circuit, and a logic function thereof is determined by programming a device by a user. A designer performs programming to "integrate" a digital system on a PLD, and a chip manufacturer does not need to be invited to design and manufacture a dedicated integrated circuit chip. Moreover, currently, in place of manually manufacturing an integrated circuit chip, this programming is also mostly implemented by using "logic compiler" software. The software is similar to a software compiler used at the time of program development and writing, and original code before compilation also needs to be written by using a particular programming language that is referred to as a hardware description language (HDL). There is a plurality of HDLs rather than only one HDL, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). Currently, VHDL (Very-High-Speed Integrated Circuit Hardware Description Language) and Verilog2 are used most generally. A person skilled in the art should also clearly know that, as long as a method process is slightly logically programmed by using the foregoing several hardware description languages and programmed into an integrated circuit, a hardware circuit for implementing the logic method process may be obtained quite easily.

A person skilled in the art also knows that, in addition to implementing a controller in a pure computer readable program code manner, it is completely feasible to logically program method steps to enable the controller to implement the same function in a form of a logic gate, a switch, an application-specific integrated circuit, a programmable logic controller, an embedded microcontroller, or the like. Therefore, this controller may be considered as a hardware component, and an apparatus that is included in the controller and that is configured to implement various functions may also be considered as a structure in the hardware component. Alternatively, an apparatus configured to implement various functions may even be considered as both a software module that may implement a method and a structure in the hardware component.

A person skilled in the art may understand that this disclosure may be implemented by hardware only or by software and a necessary universal hardware platform. Based on such understandings, the technical solution under this disclosure or the part that makes contributions to the prior art may be essentially embodied in the form of a software product. The software product may be stored in a storage medium such as a ROM/RAM, a magnetic disk, or an optical disc. The software product includes several instructions that enable a computer device (a personal computer, a server, or a network device) to execute the methods provided in the implementations of this disclosure.

Although this disclosure is described by using the implementations, a person of ordinary skill in the art knows that, this disclosure has many transformations and changes without departing from the spirit of this disclosure, and it is intended that the appended claims include these transformations and changes without departing from the spirit of this disclosure.

What is claimed is:

1. A data update method, comprising:
    acquiring at least a first piece of audio data of a user in a first conversation scenario and at least a second piece of audio data of the user in a second conversation scenario;
    performing voiceprint recognition on the first and second pieces of audio data based on voiceprint information of the user;
    acquiring audio feature information of the first and second pieces of audio data; and
    updating the voiceprint information of the user according to the audio feature information;
    wherein the updating the voiceprint information of the user according to the audio feature information comprises:
        storing a portion of the audio feature information corresponding to the user;
        determining whether an amount of the portion of the audio feature information corresponding to the user reaches a second threshold;
        calculating a matching degree between the audio feature information and the voiceprint information of the user; and
        in response to determining that the amount of the portion of the audio feature information corresponding to the user reaches the second threshold and the matching degree is not greater than a fourth threshold, updating the voiceprint information of the user according to the audio feature information.

2. The method according to claim 1, wherein before updating the voiceprint information of the user according to the audio feature information, further comprising:
    determining if voiceprint information matching the audio feature information exists; and
    in response to determining the voiceprint information matching the audio feature information, determining information of the user associated with the voiceprint information.

3. The method according to claim 1, wherein the acquiring audio feature information of the first and second pieces of audio data comprises:
    respectively extracting the audio feature information of the first and second pieces of audio data;
    acquiring user identifier information of the user; and
    respectively associating the audio feature information with the user identifier information.

4. The method according to claim 1, wherein the acquiring audio feature information of the first and second pieces of audio data comprises:
    storing the first and second pieces of audio data;
    determining whether an amount of the audio data reaches a first threshold; and
    in response to determining that the amount of the audio data reaches the first threshold, respectively extracting the audio feature information of the first and second pieces of audio data.

5. The method according to claim 1, wherein the updating the voiceprint information of the user comprises:
    updating the voiceprint information of the user according to a preset time frequency.

6. The method according to claim 1, wherein the updating the voiceprint information of the user according to the audio feature information comprises:
    storing the portion of the audio feature information corresponding to the user in a preset data set;
    determining whether a total amount of audio feature information stored in the preset data set reaches a third threshold; and
    in response to determining that the total amount of the audio feature information stored in the preset data set reaches the third threshold, updating the voiceprint information of the user according to the audio feature information.

7. The method according to claim 1, wherein after the updating the voiceprint information of the user, the method further comprises:
    acquiring most recently extracted audio feature information corresponding to the user after the update, and acquiring voiceprint information existing before the update;
    respectively calculating matching degrees between the most recently extracted audio feature information existing after the update and each of the voiceprint information existing before and after the update; and if the matching degree between the most recently extracted audio feature information existing after the update and the voiceprint information existing before the update is greater than the matching degree between the most recently extracted audio feature information existing after the update and the voiceprint information existing after the update, restoring the voiceprint information of the user to the voiceprint information existing before the update.

8. A data update method, the method comprising:
acquiring at least a first piece of audio data of a user in a first conversation scenario and at least a second piece of audio data of the user in a second conversation scenario;
respectively extracting audio feature information of each of the pieces of audio data, and respectively performing voice recognition on each of the pieces audio data according to the audio feature information;
when the voice recognition of the audio data succeeds, determining a target user corresponding to the audio data; and
updating voiceprint information of the target user according to the audio feature information of at least one piece of the audio data of the target user,
wherein the updating voiceprint information of the target user comprises:
storing a portion of the audio feature information corresponding to the target user;
determining whether an amount of the portion of the audio feature information corresponding to the target user reaches a second threshold; and
in response to determining that the amount of the portion of the audio feature information corresponding to the target user reaches the second threshold, updating the voiceprint information of the target user according to the audio feature information.

9. The method according to claim 8, wherein the updating voiceprint information of the target user comprises:
storing the portion of the audio feature information corresponding to the target user in a preset data set;
determining whether a total amount of audio feature information stored in the preset data set reaches a third threshold; and
in response to determining that the total amount of the audio feature information stored in the preset data set reaches the third threshold, updating the voiceprint information of the target user according to the audio feature information.

10. The method according to claim 8, wherein the updating voiceprint information of the target user comprises:
calculating a matching degree between the audio feature information and the voiceprint information of the target user; and
if the matching degree is not greater than a fourth threshold, updating the voiceprint information of the target user according to the audio feature information.

11. The method according to claim 8, further comprising:
acquiring most recently obtained audio feature information corresponding to the target user after update, and voiceprint information existing before the update;
respectively calculating matching degrees between the most recently obtained audio feature information existing after the update and voiceprint information existing before and after the update; and
if the matching degree between the most recently extracted audio feature information existing after the update and the voiceprint information existing before the update is greater than the matching degree between the most recently extracted audio feature information existing after the update and the voiceprint information existing after the update, restoring the voiceprint information of the target user to the voiceprint information existing before the update.

12. A data update system, comprising:
a microphone configured to acquire at least a first piece of audio data of a user in a first conversation scenario and at least a second piece of audio data of the user in a second conversation scenario; and
a processor and a non-transitory computer-readable storage medium storing instructions that, when executed by the processor, cause the system to perform a data update method, the method comprising:
performing voiceprint recognition on the first and second pieces of audio data based on voiceprint information of the user;
acquiring audio feature information of the first and second pieces of audio data; and
updating the voiceprint information of the user according to the audio feature information,
wherein the updating the voice information of the user according to the audio feature information comprises:
storing a portion of the audio feature information corresponding to the user;
determining whether an amount of the portion of the audio feature information corresponding to the user reaches a second threshold; and
in response to determining that the amount of the portion of the audio feature information corresponding to the user reaches the second threshold, updating the voiceprint information of the user according to the audio feature information.

13. The data update system according to claim 12, wherein the acquiring audio feature information of the first and second pieces of audio data comprises:
storing the first and second pieces of audio data;
determining whether an amount of the audio data reaches a first threshold; and
in response to determining that the amount of the audio data reaches the first threshold, respectively extracting the audio feature information of the first and second pieces of audio data.

14. The data update system according to claim 12, wherein the updating the voiceprint information of the user according to the audio feature information comprises:
storing the portion of the audio feature information corresponding to the user in a preset data set;
determining whether a total amount of audio feature information stored in the preset data set reaches a third threshold; and
in response to determining that the total amount of the audio feature information stored in the preset data set reaches the third threshold, updating the voiceprint information of the user according to the audio feature information.

15. The data update system according to claim 12, wherein the updating the voiceprint information of the user according to the audio feature information comprises:
calculating a matching degree between the audio feature information and the voiceprint information of the user; and
if the matching degree is not greater than a fourth threshold, updating the voiceprint information of the user according to the audio feature information.

16. The data update system according to claim 12, wherein the method further comprises:
- acquiring most recently extracted audio feature information corresponding to the user after the update, and acquiring voiceprint information existing before the update;
- respectively calculating matching degrees between the most recently extracted audio feature information existing after the update and each of the voiceprint information existing before and after the update; and
- if the matching degree between the most recently extracted audio feature information existing after the update and the voiceprint information existing before the update is greater than the matching degree between the most recently extracted audio feature information existing after the update and the voiceprint information existing after the update, restoring the voiceprint information of the user to the voiceprint information existing before the update.

\* \* \* \* \*